United States Patent [19]

Fulks et al.

[11] Patent Number: 5,607,035

[45] Date of Patent: Mar. 4, 1997

[54] HYDRAULIC DAMPER

[75] Inventors: Gary C. Fulks, Spring Valley, Ohio; Nicholas Jones, La Morlaye, France; Manuel T. Barbosa, Cadiz, Spain; Francisco J. S. Jimenez, Cadiz, Spain; Antonio P. De La Lastra Arjona, Cadiz, Spain; Miguel C. Garcia, Cadiz, Spain; Jose I. M. Gorostidi, Cadiz, Spain

[73] Assignees: Delphi France Automotive Systems, Gennevilliers, France; Delphi Automotive Systems Espana S.A., Cadiz, Spain

[21] Appl. No.: 324,467

[22] Filed: Oct. 17, 1994

[51] Int. Cl.⁶ .................................................... F16F 9/00
[52] U.S. Cl. ..................................................... 188/322.19
[58] Field of Search ......................... 188/321.11, 322.11, 188/322.19; 280/668, 673, 674, 103; 403/265, 268; 156/305; 29/469.5

[56] References Cited

U.S. PATENT DOCUMENTS

| | | | |
|---|---|---|---|
| 3,912,054 | 10/1975 | Fabre et al. | 188/282 |
| 4,321,988 | 3/1982 | Bich | 188/322.11 |
| 4,480,730 | 11/1984 | Koller et al. | 188/315 |
| 4,648,616 | 3/1987 | Diekman et al. | 403/265 |
| 4,657,228 | 4/1987 | Lautzenhiser | 267/64.15 |
| 4,667,941 | 5/1987 | Hayashi et al. | 267/64.16 |
| 4,721,325 | 1/1988 | Mackovjak | 280/668 |
| 4,971,348 | 11/1990 | Oyama et al. | 280/668 |
| 5,178,239 | 1/1993 | Homme | 188/322.21 |

FOREIGN PATENT DOCUMENTS

| | | |
|---|---|---|
| 848457 | 9/1952 | France . |
| 2437310 | 4/1980 | France . |
| 2558230 | 7/1985 | France . |
| 1356261 | 6/1974 | United Kingdom . |
| 2074917 | 11/1981 | United Kingdom . |
| 2093157 | 8/1982 | United Kingdom . |
| 2104186 | 3/1983 | United Kingdom . |
| 2187532 | 9/1987 | United Kingdom . |
| 2229512 | 9/1990 | United Kingdom . |

OTHER PUBLICATIONS

Patent Abstracts of Japan, vol. 16 No. 452 (M–1313) 21 Sep. 1992 & JP-A-04 158 946 (Atsugi Unisia) 2 Jun. 1992 *abstract*.

Patent Abstracts of Japan vol. 17 No. 604 (M–1506) 8 Nov. 1993 & JP-A-05 180 256 (Yamakawa Ind Co) 20 Jul. 1993 *abstract*.

European Search Report corresponding to EP 94 20 2967 dated 8 Mar. 1995 & Annex to the European Search Report.

*Primary Examiner*—Robert J. Oberleitner
*Assistant Examiner*—Chris Schwartz
*Attorney, Agent, or Firm*—Jeffrey A. Sedlar

[57] ABSTRACT

A hydraulic damper for a motor vehicle comprising a longitudinally extending tube and a separately formed steering knuckle secured to the tube, wherein the tube is formed from extruded aluminum or aluminum alloy, and the steering knuckle is formed from aluminum or aluminum alloy. The steering knuckle includes a tubular portion that overlies and is secured to a portion of the tube through the use of a groove in the tubular portion and a groove in the tube. Adhesive may be injected into the grooves to aid in securing the steering knuckle to the tube.

2 Claims, 9 Drawing Sheets

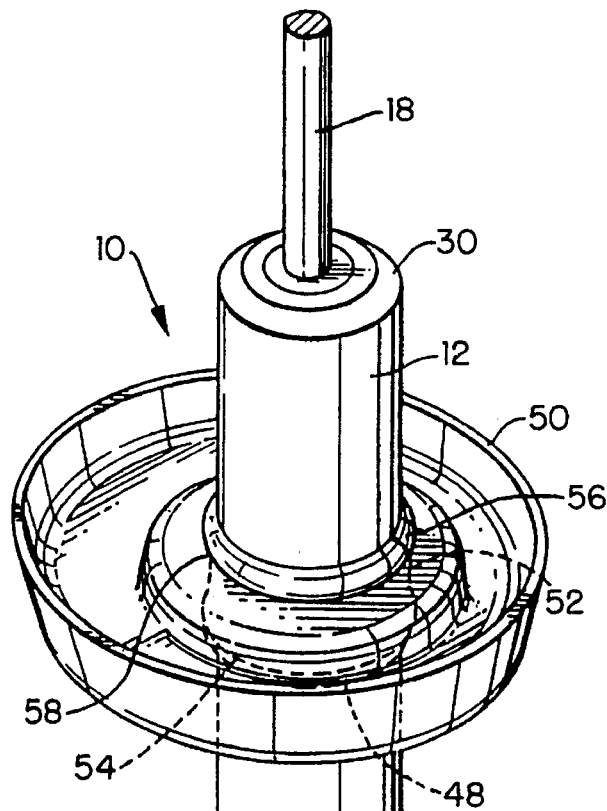
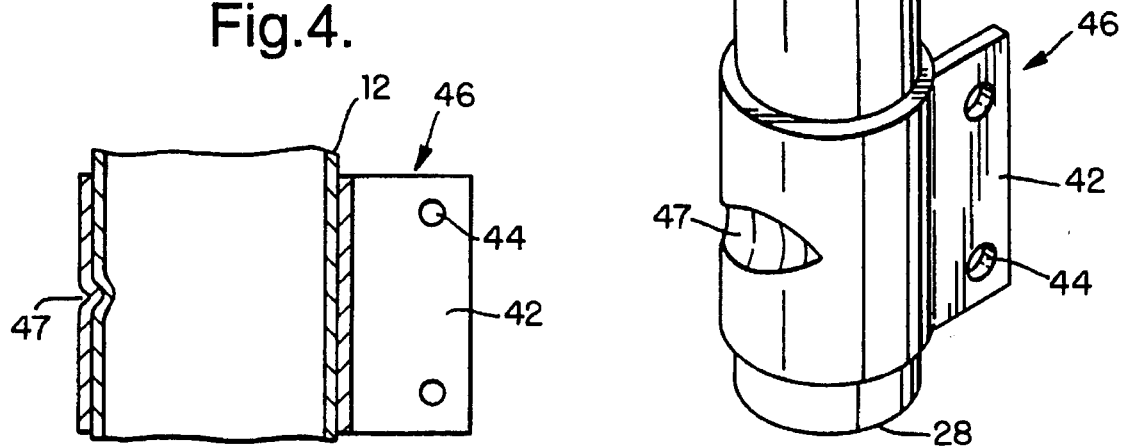

5,607,035

HYDRAULIC DAMPER

BACKGROUND OF THE INVENTION

This invention relates to a hydraulic damper for a motor vehicle, and to a method of forming such a hydraulic damper. By hydraulic damper is meant a suspension strut or shock absorber.

Attention is drawn to related U.S. patent application Ser. No. 08/324,146 entitled "Spin Closing Apparatus and Method", Ser. No. 08/324,147 entitled "Hydraulic Damper" and Ser. No. 08/380,549 entitled "Hydraulic Damper"), filed concurrently with the present application.

A hydraulic damper for use in the suspension system of a motor vehicle typically comprises a tube; a piston sealably slidably mounted in the tube and attached to a piston rod, the piston separating a compression chamber from a rebound chamber within the tube; a compression stroke valve mounted on the piston which allows fluid flow from the compression chamber to the rebound chamber; and a rebound stroke valve mounted on the piston which allows fluid flow from the rebound chamber to the compression chamber. The piston rod extends out of the tube at one end thereof, and is sealably slidably mounted in that one end. Such hydraulic dampers either comprise an inner tube and an outer tube (sometimes referred to as a twin tube damper) in which the piston sealably slides in the inner tube, or comprise a single tube (sometimes referred to as a monotube damper).

It is usual practice to form the or each tube of a hydraulic damper by rolling a sheet of steel and welding together the adjacent longitudinal edges. External parts, such as the spring seat and the mounting bracket or steering knuckle, which are also formed from steel, are then welded to the single tube or the outer tube. The other end of the tube is sealed closed by welding on an end plate or by arc-heating and rolling the tube end, and the internal components of the suspension strut (such as those mentioned above) are inserted into the tube by way of the one end thereof, which is then sealed closed. The use of several welding steps has disadvantages in that welds are time consuming operations. Further, welds are susceptible to corrosion. Still further, the use of steel has disadvantages with regard to weight.

SUMMARY OF THE INVENTION

It is an object of the present invention to overcome one or more of the above mentioned disadvantages.

To this end, a hydraulic damper in accordance with the present invention comprises a longitudinally extending tube and a separately formed mounting means secured to the tube, wherein the tube is formed from extruded aluminum or aluminum alloy, and the mounting means is formed from aluminum or aluminum alloy.

A method of forming a hydraulic damper in accordance with the present invention comprises extruding a tube of aluminum or aluminum alloy; forming a steering knuckle of aluminum or aluminum alloy; and securing the mounting means to the extruded tube.

For the sake of clarity, the term 'mounting means' used herein comprises any means by which the hydraulic damper can be mounted on a motor vehicle, and includes a mounting bracket or steering knuckle.

This invention removes the steps of welding, thereby removing time consuming operations. Further the use of aluminum or aluminum alloy has advantages with regard to weight when compared to previously known arrangements.

BRIEF DESCRIPTION OF THE DRAWINGS

The present invention will now be described, by way of example, with reference to the accompanying drawings, in which:

FIG. 3 is a perspective view of the hydraulic damper of FIG. 1 with a spring seat mounted thereon and the mounting bracket secured in position.

FIG. 4 is a cross-sectional view of the extruded outer tube and the mounting bracket of the hydraulic damper of FIG. 1 after securing the mounting bracket.

DETAILED DESCRIPTION OF THE PRESENTLY PREFERRED EMBODIMENT

Figure 1:
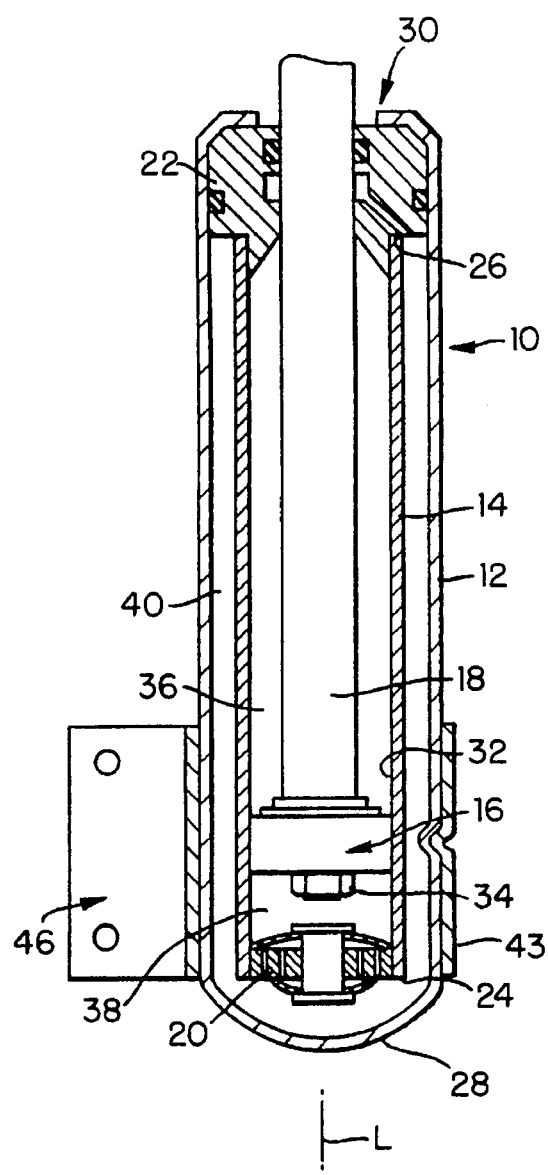
FIG. 1 is a cross-sectional view of a hydraulic damper in accordance with the present invention.

Referring to the drawings, the hydraulic damper 10 shown in FIG. 1 is of the twin tube damper type, and comprises an outer tube 12, and an inner tube 14 substantially coaxial with the outer tube on an axis L. The outer tube 12, and preferably the inner tube 14, are formed from extruded aluminum or aluminum alloy and have a substantially constant cross-section along their length. The hydraulic damper 10 further comprises conventional components such as a piston assembly 16, a piston rod 18 having a longitudinal axis on axis L, a compensation valve 20, and a rod guide 22. The piston assembly 16 includes a compression valve and a rebound valve (not shown). The piston assembly 16, the compensation valve 20 and the rod guide 22 may be any suitable conventional design well known to those skilled in the art, and will not be described in detail. The inner tube 14 is substantially closed at one end 24 by the compensation valve 20, and is substantially closed at the other end 26 by the rod guide 22. The outer tube 12 is closed at one end 28 by flame heating and rolling the outer tube walls, and is substantially closed at the other end 30 (the open end) by the rod guide 22 and by spin closing the end 30 of the outer tube.

An example of apparatus suitable for spin closing is disclosed in GB Patent Application No. 9412806.3 and corresponding U.S. patent application Ser. No. 08/324,146 filed concurrently with the present application) incorporated herein by reference, in which a pair of rollers initially push a portion of the outer tube at the open end over at approximately 45 degrees, and a second pair of rollers then push a section of the portion over at approximately 90 degrees, whilst the outer tube is spinning about its longitudinal axis. A detailed description of the apparatus disclosed in GB Patent Application No. 9412806.3 is reproduced infra. Drawings related to the apparatus description are included as FIGS. 10–14.

The piston rod 18 extends through, and makes a sealing sliding fit with the rod guide 22. The piston assembly 16 makes a sealing sliding fit with the inner surface 32 of the inner tube 14. The piston rod 18 is secured to the piston assembly 16 by a nut 34 or any other suitable means. The piston assembly 16 divides the inner area of the inner tube 14 into a rebound chamber 36 and a compression chamber 38. The area between the inner tube 14 and the outer tube 12 defines a compensation chamber 40. The rebound and compression chambers 36 and 38 are substantially filled with fluid to damp reciprocating movement of the piston assembly 16 and piston rod 18 along axis L relative to the outer and inner tubes 12 and 14. The compensation chamber 40 is partly filled with fluid and acts as a reservoir for the fluid in the rebound and compression chambers 36 and 38. The hydraulic damper 10 is mounted in a motor vehicle (not shown) using mounting means in the form of a mounting bracket 46.

The mounting bracket 46 (FIG. 2) is extruded from aluminum or aluminum alloy to integrally form a tubular portion 43 with a pair of spaced arms 42 which are substantially parallel. The tubular portion 43 has an internal diameter which is sized to make a close sliding fit on the outer tube 12. Pairs of holes 44 are cut in each arm 42 to form mounting apertures for the mounting bracket 46. The mounting bracket 46 is then slid into position on the outer tube 12, and is secured in place by pressing or punching a tangentially extending groove 47 in the tubular portion 43 and the outer tube 12 as shown in FIGS. 3 and 4. The groove 47 extends in a direction which is substantially at right angles to the axis L.

Figure 5:
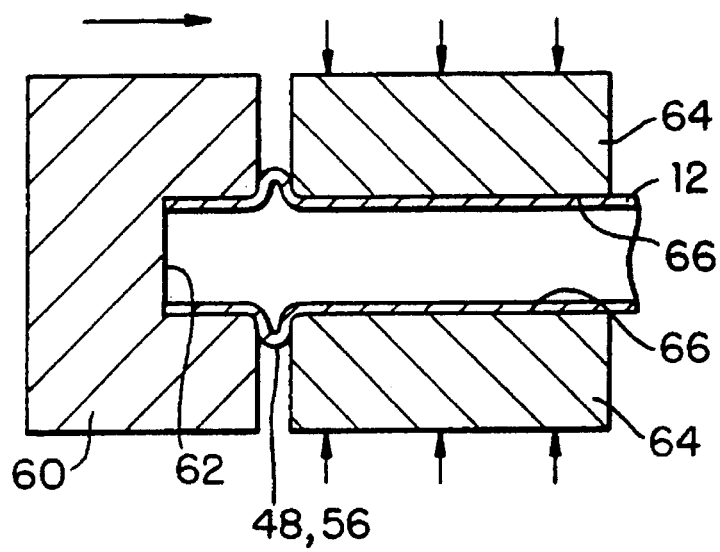
FIG. 5 is a cross-sectional view apparatus for forming beads in the extruded tube of the hydraulic damper of FIG. 1.

A spring seat 50 may be attached to the outer tube 12 as shown in FIG. 3 as follows. A first external, circumferentially extending, bead 48 is formed in the outer tube 12. The spring seat 50 (of aluminum or aluminum alloy) is formed by pressing or casting and includes a cylindrical section 52 which has an internal shape and size which is substantially the same as the external shape and size of the outer tube 12—that is, the cylindrical section can make a close sliding fit on the outer tube. The spring seat 50 is slid onto the outer tube 12, with the tube passing through the cylindrical section 52 until one end 54 of the cylindrical section rests on the first bead 48. A second external, circumferentially extending, bead 56 is then formed in the outer tube 12 adjacent the other end 58 of the cylindrical section 52 to secure the spring seat 50 on the outer tube. The external circumferentially extending beads 48,56 are preferably formed as shown in FIG. 5 by positioning one end of the extruded tube 12 in a die 60 having a correspondingly shaped closed bore 62, and by positioning a pair of substantially identical dies 64 having substantially semi-circular grooves 66 therein around the extruded tube but slightly spaced from the die 60. The dies 64 are then moved towards one another to grip the extruded tube 12 and the die 60 moved towards the dies 64 to form the bead 48,56, the relative movement being indicated by the arrows in FIG. 5.

As an alternative to this arrangement, the spring seat 50 may be secured by sliding the spring seat into position and then forming the two beads, or by forming two rings of external dimples rather than beads, or by rivets, or any other suitable alternative arrangement. Either prior to, or after, attachment of the spring seat 50, the one end 28 of the outer tube 12 is closed by flame heating the end of the outer tube, and then rolling over the end. Having formed the outer tube 12 with the mounting bracket 46 and the spring seat 50 secured thereto, and having closed the one end 28, the other components (as described above) of the hydraulic damper 10 can then be assembled therein.

Figure 2:
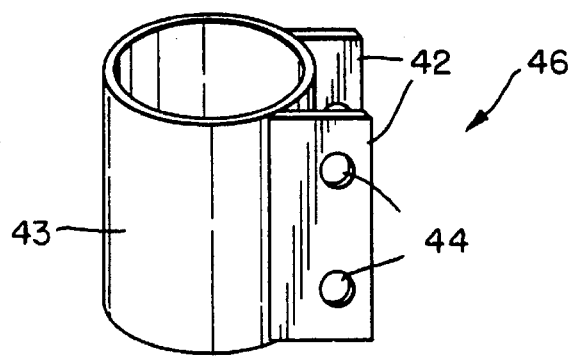
FIG. 2 is a perspective view of the extruded mounting bracket of the hydraulic damper of FIG. 1.

As an alternative to the use of the groove 47, the mounting bracket could be formed as shown in FIG. 2, but with the tubular portion 43 having an internal diameter which is slightly smaller than the external diameter of the extruded tube 12. In this arrangement, the mounting bracket 46 is attached to the extruded tube by heating the mounting bracket to cause the tubular portion 43 to expand, sliding the mounting bracket into position on the extruded tube 12, and then cooling the mounting bracket such that the tubular portion contracts and frictionally grips the extruded tube. As a further alternative, the mounting bracket 46 may be attached by adhesive (in a similar manner to that described below with regard to FIG. 9). In either of the above two described alternatives, the external surface of the extruded tube 12 may be formed with longitudinally extending ribs and the internal surface of the tubular portion 43 may be formed with corresponding grooves (or vice versa) to correctly aligned and/or position the mounting bracket 46 on the extruded tube—in a similar manner to that described below with regard to FIGS. 7 and 8. As a still further alternative the external surface of the extruded tube 12 and the internal surface of the tubular portion 43 may be provided with screw threads (in a similar manner to that described below in regard to FIG. 6), and the mounting bracket 46 may be attached to the extruded tube by screw threading. In a still further alternative, the mounting bracket 46 may be secured in position between a pair of external circumferentially extending beads formed in the outer tube 12 as described above in relation to the fixing of the spring seat 50.

Figure 6:
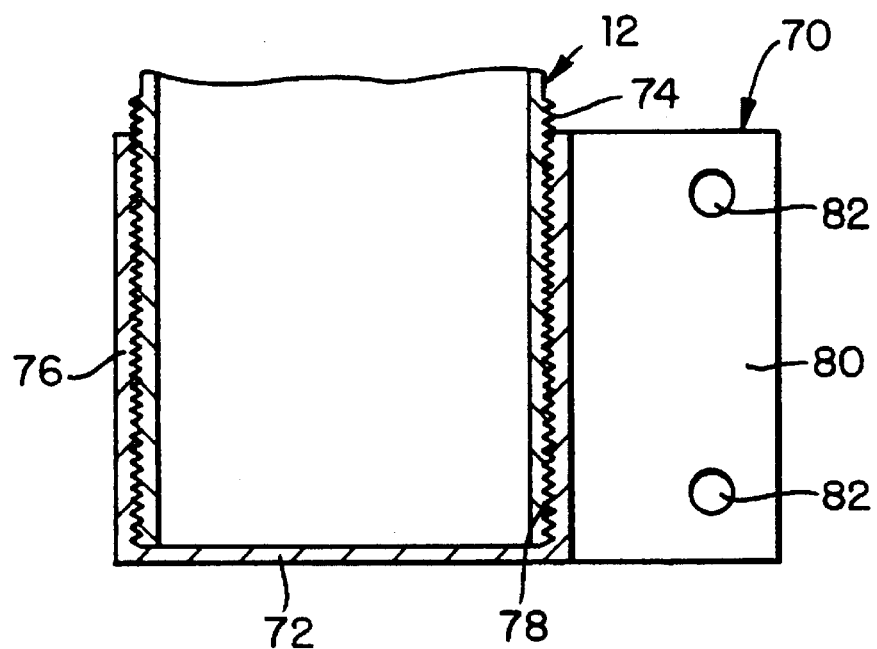
FIG. 6 is a cross-sectional view of an alternative steering knuckle for the hydraulic damper of FIG. 1.

As an alternative to flame heating and rolling closed the one end 28 of the outer tube 12, the one end may be sealed and closed by a separately formed end plate or by flattening the one end of the outer tube into a substantially planar formation, and then rolling the planar formation in the longitudinal direction. A preferred alternative, however, is to cast a mounting bracket 70 with an integral end cap 72 of aluminum or aluminum alloy as shown in FIG. 6. In this arrangement, after extrusion of the tube 12, an external threaded surface 74 is formed therein adjacent the one end 28. The mounting bracket 70 is cast with a tubular portion 76 which is closed by the end cap 72 and with an internal threaded surface 78, and with one or more mounting arms 80. Holes 82 in the arms 80 provide mounting apertures for the mounting bracket 70. The mounting bracket 70 is attached to the extruded tube 12 by screw threading and the end cap 72 closes the one end 28 of the extruded tube. In an alternative arrangement, the threaded surfaces may be omitted, and the integral mounting bracket and end cap may be secured to the extruded tube by adhesive in a similar manner to that described below in relation to FIG. 9.

Figure 7:
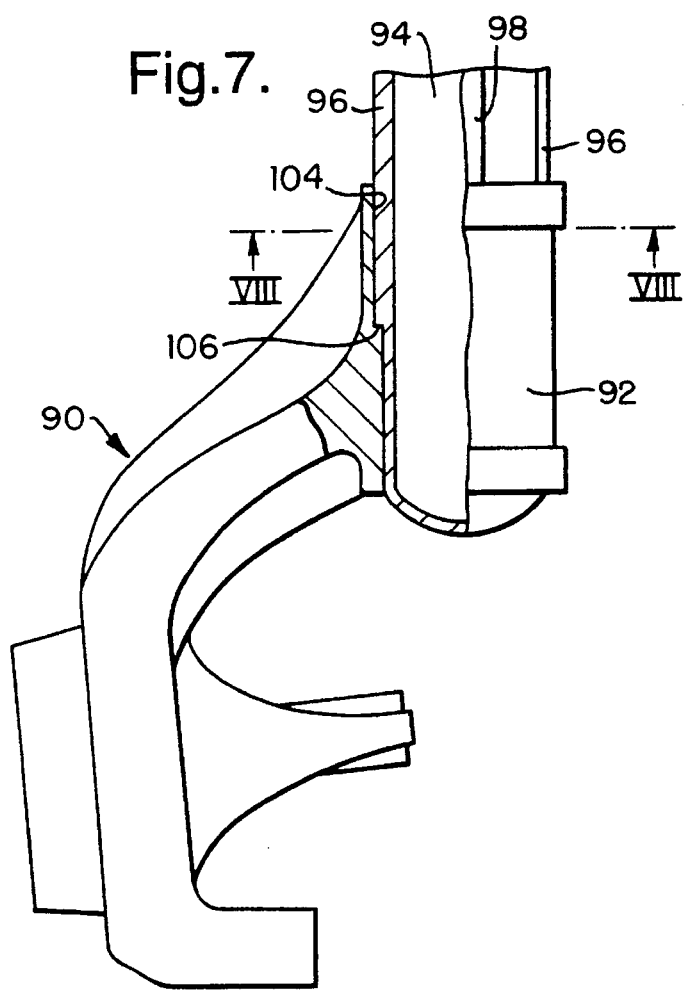
FIG. 7 is a partial cross-sectional view of a further alternative mounting means for the hydraulic damper of FIG. 1.
Figure 8:
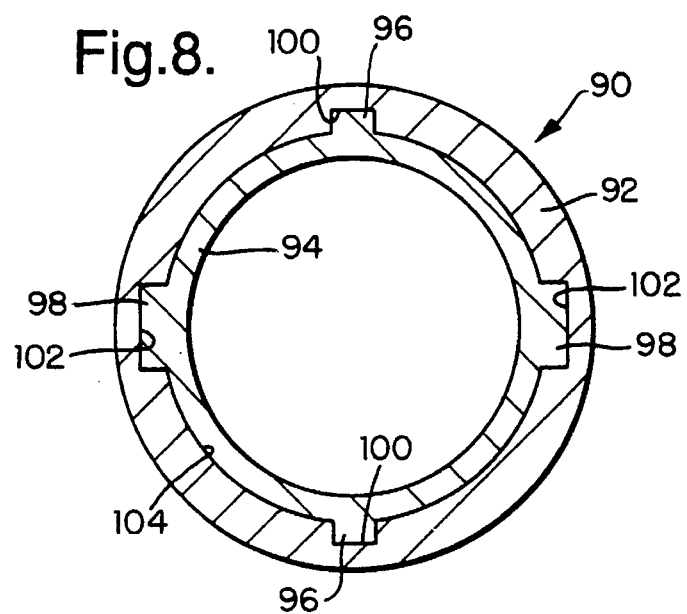
FIG. 8 is a cross-sectional view on the line VIII—VIII of FIG. 7.

As shown in FIG. 7, the steering knuckle is in the form of a steering knuckle 90 which is cast from aluminum or aluminum alloy. The steering knuckle 90 comprises a tubular portion 92 which is open at both ends, although one end may be closed to form an end cap for the extruded tube. In a preferred arrangement, the extruded tube 94 is formed with two pairs of external, longitudinally (axially) extending, outwardly directed, ribs 96,98, (FIG. 8) with the ribs of each pair being diametrically opposed, and the pairs being set at right angles to one another. The ribs 96,98 of each pair have substantially the same cross-sectional shape and area, but different from the cross-sectional shape and area of the other pair of ribs. The tubular portion 92 of the steering knuckle 90 has correspondingly shaped and sized grooves 100,102 formed in its internal surface 104. This arrangement allows the steering knuckle 90 to make a close sliding fit with the extruded tube 94, and also provide means for correctly locating the steering knuckle relative to the extruded tube. A part of one or more of the ribs 96,98 may be removed and a part of the corresponding groove or grooves 100,102 may be omitted to provide one or more pairs of engaging shoulders 106 which act as a stop to again correctly locate the steering knuckle 90 on the extruded tube 94. The steering knuckle 90 may be attached to the extruded tube 94 by frictional grip, by heating the tubular portion 92, positioning the tubular portion on the extruded tube, and then cooling the tubular portion. Without the presence of the ribs 96,98 and the grooves 100,102, the steering knuckle may be attached to the extruded tube by screw threading in a similar manner to that described above with respect to FIG. 6. Preferably, however, the steering knuckle 90 is attached to the extruded tube 94 by adhesive, with or without the presence of the ribs 96,98 and grooves 100,102, as described below with reference to FIG. 9.

Figure 9:
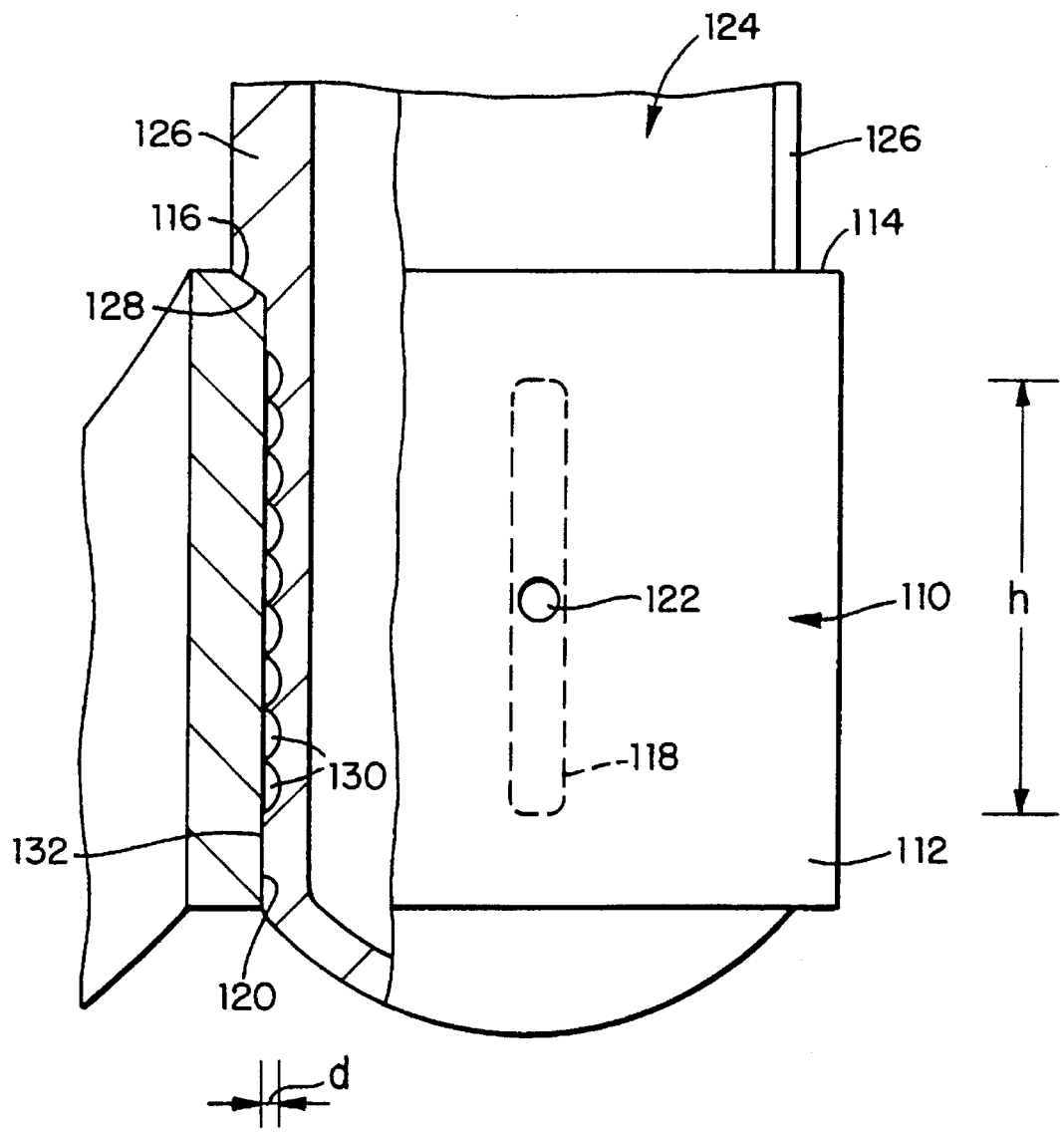
FIG. 9 is a partial cross-sectional view of a further alternative mounting means for the hydraulic damper of FIG. 1.

In the alternative arrangement shown in FIG. 9, a steering knuckle 110 has a tubular portion 112 cast from aluminum or aluminum alloy. One end 114 of the tubular portion 112 is formed with a tapered surface 116. Two longitudinally (axially) extending grooves 118 are formed in the inner surface 120 of the tubular portion 112, the grooves being substantially diametrically opposed and of predetermined height h. A hole 122 is cut through the tubular portion 112 to open into each groove 118. The extruded tube 124 of aluminum or aluminum alloy has a pair of external longitudinally extending ribs 126 which are cut to form a tapered end 128. The tapered end 128 and the tapered surface 116 on the tubular portion 112 define shoulders which engage to provide a stop for locating the steering knuckle 110 on the extruded tube 124. A number of circumferentially extending grooves 130 are cut in the outer surface 132 of the extruded tube 124 adjacent the tapered end 128 over a predetermined height which is substantially the same as the height h of the grooves 118 in the tubular portion 112. The grooves 130 have a predetermined depth d. The steering knuckle 110 is secured in position by injecting a suitable adhesive, under pressure, into one of the holes 122 in the tubular portion 112 and along the corresponding groove 118. The pressure forces the adhesive to travel around and fill the grooves 130, pass into the opposite groove 118, and then extrude out through the corresponding hole 122. The depth d of the grooves 130 is determined to provide the necessary working properties (strength) for the adhesive. As an alternative to the grooves 130, any other suitable means for providing a space between the inner surface of the tubular portion and the outer surface of the extrude tube may be used to provide the required working depth for the adhesive.

The other end 30 of the extruded tube 12 may be closed by a threaded cap as an alternative arrangement to spin closing.

Whilst the above described embodiments refer to the twin tube type of hydraulic damper, it will be appreciated that at least some of these arrangements are also applicable to hydraulic dampers of the monotube type in which the sole tube of the damper is formed from extruded aluminum or aluminum alloy and has an aluminum or aluminum alloy mounting means attached thereto.

Preferably the extruded tube and the mounting means are formed from aluminum alloy conforming to BS 6082 and which comprises, by weight percentage, 0.70 to 1.3% Si, 0.5% Fe, 0.1% Cu, 0.4 to 1.0% Mn, 0.6 to 1.2% Mg, 0.25% Cr, 0.2% Zn, 0.1% Ti, 0.05 to 0.15% impurities, with the remainder being aluminum. Other compositions of aluminum alloy may be used.

All of the above described arrangements have advantages in terms of easier manufacture and assembly, and of providing a hydraulic damper of reduced weight compared to previously known arrangements.

Following is a detailed description of spin closing apparatus according to GB Patent Application No. 9412806.3 and corresponding U.S. patent application Ser. No. 08/324,146. FIGS. 10–14 and the following description related thereto are included to supplement the disclosure, which as filed in the corresponding foreign case, incorporates this material by reference. The corresponding foreign case will be filed as a continuing application of GB Patent Application No. 9323047.2.

Figure 10:
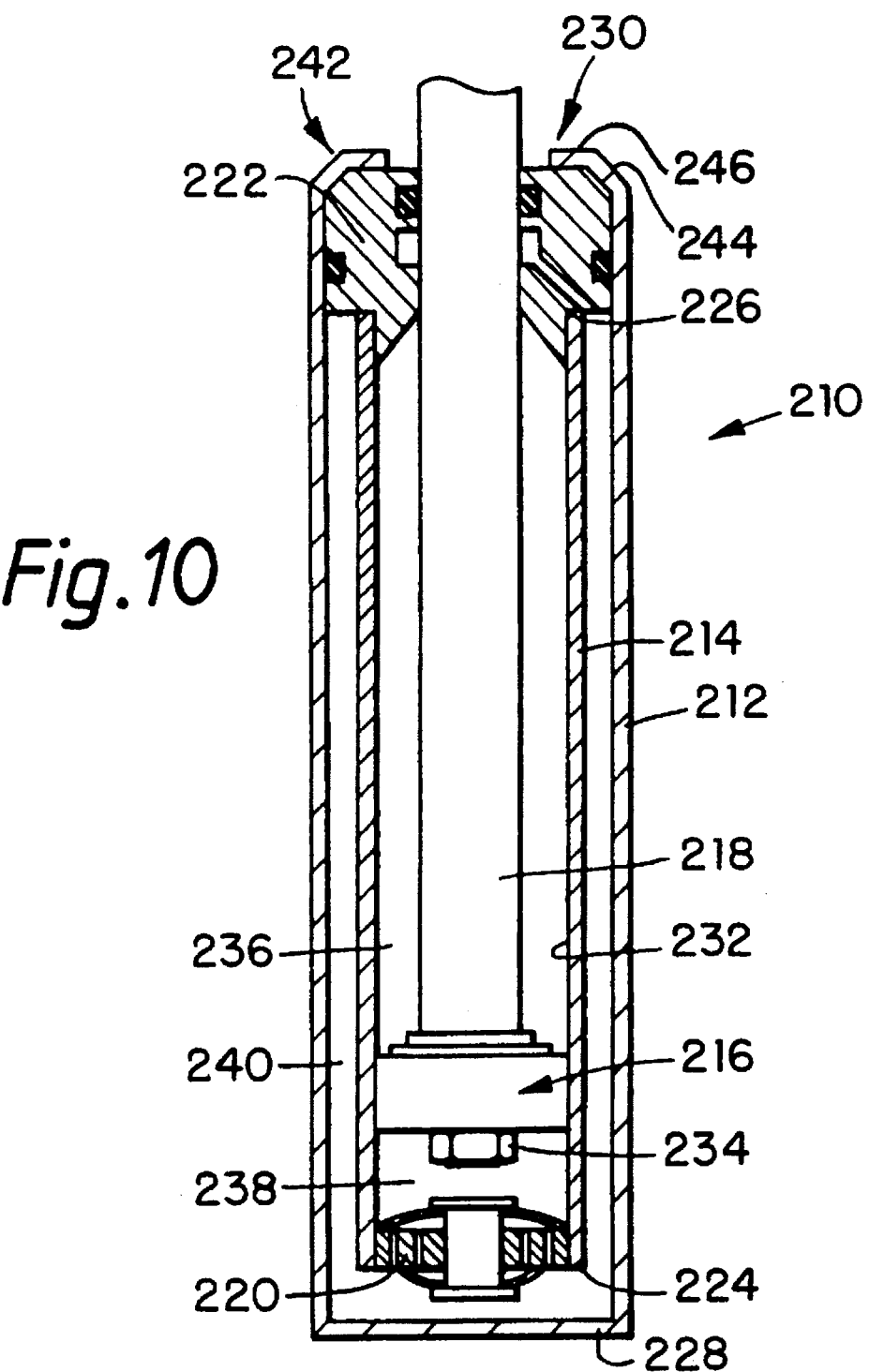
FIG. 10 is a cross-sectional view of a suspension strut.

Referring to the drawings, the suspension strut 210 shown in FIG. 10 is of the twin tube damper type, and comprises an outer tube 212, an inner tube 214 substantially coaxial with the outer tube on an axis L, a piston assembly 216, a piston rod 218 having a longitudinal axis on axis L, a compensation valve 220, and a rod guide 222. The piston assembly 216, the compensation valve 220 and the rod guide 222 may be any suitable conventional design well known to those skilled in the art, and will not be described in detail. The inner tube 214 is substantially closed at one end 224 by the compensation valve 220, and is substantially closed at the other end 226 by the rod guide 222. The outer tube 212 is closed at one end 228 by an integral formation of the outer tube walls, and is substantially closed at the other end 230 (the open end) by the rod guide 222 and by spin closing the end 230 of the tube as will be described in more detail below. The piston rod 218 extends through, and makes a sealing sliding fit with the rod guide 222. The piston assembly 216 makes a sealing sliding fit with the inner surface 232 of the inner tube 214. The piston rod 218 is secured to the piston assembly 216 by a nut 234 or any other suitable means. The piston assembly 216 divides the inner area of the inner tube 214 into a rebound chamber 236 and a compression chamber 238. The area between the inner tube 214 and the outer tube 212 defines a compensation chamber 240. The rebound and compression chambers 236 and 238 are substantially filled with fluid to damp reciprocating movement of the piston assembly 216 and piston rod 218 along axis L relative to the outer and inner tubes 212 and 214. The compensating chamber 240 is partly filled with fluid and acts as a reservoir for the fluid in the rebound and compression chambers 236 and 238. The suspension strut 210 is mounted in a motor vehicle (not shown) in the standard manner.

Figure 11:
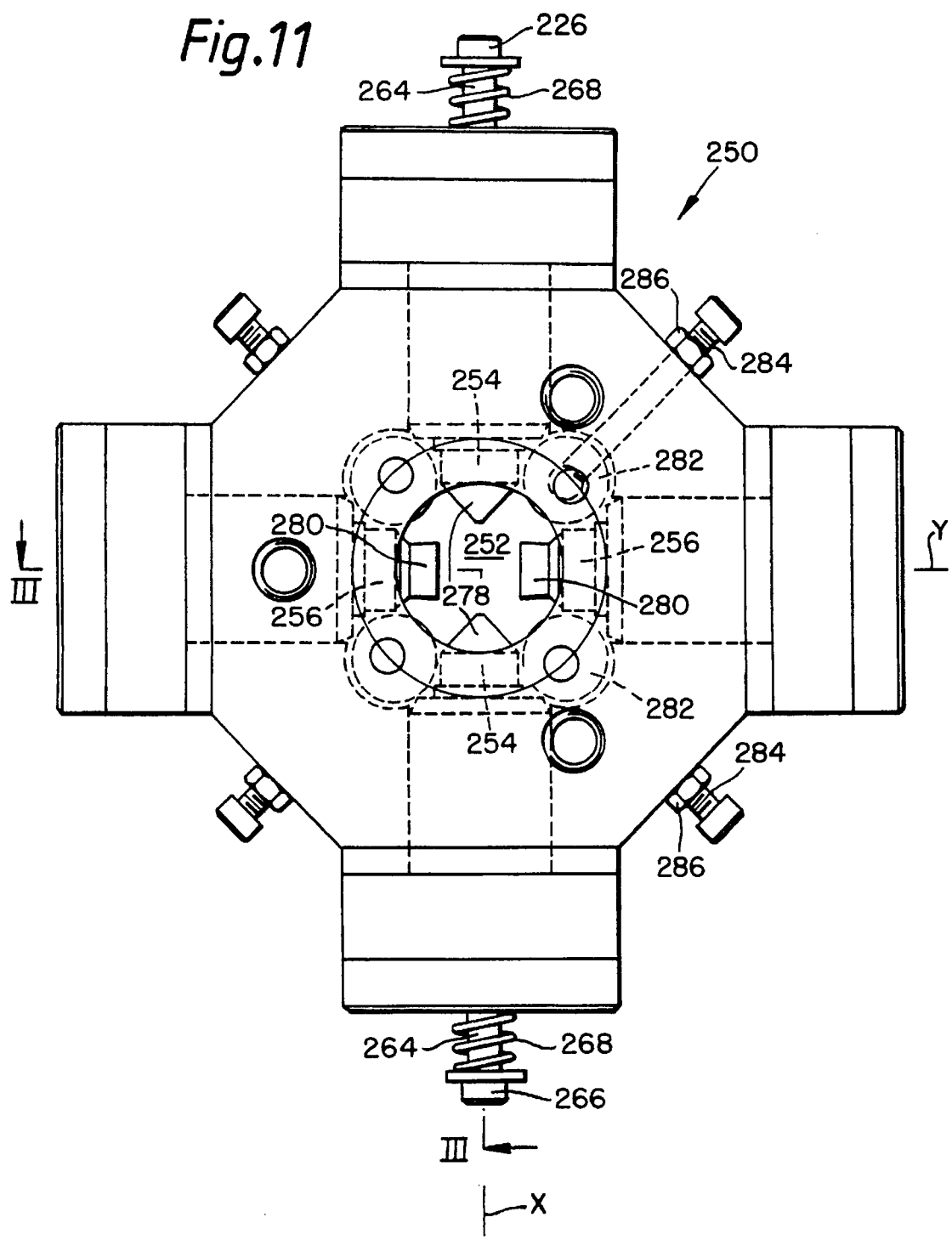
FIG. 11 is a top view of a spin closing apparatus.
Figure 12:
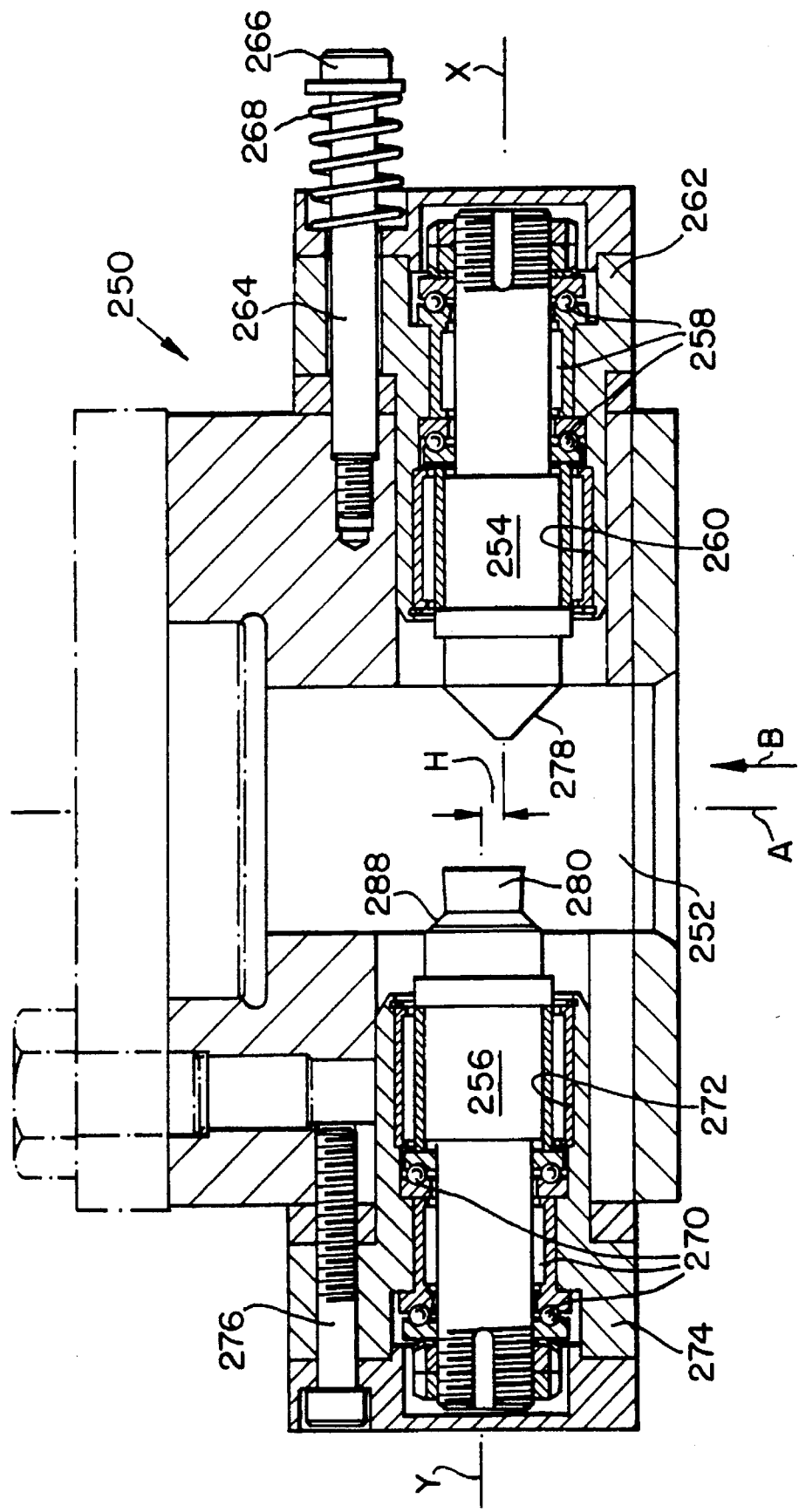
FIG. 12 is a cross-sectional view on the line III—III of FIG. 11.

The end 230 of the outer tube 212 comprises a section 242 of the outer tube which is directed inwardly towards the axis L. The section 242 comprises a first portion 244 which is directed inwardly at an angle of approximately 45° to the axis L, and a second portion 246 at the extremity of the outer tube 212 which is directed inwardly at an angle of approximately 90° to the axis L. Prior to spin closing the section 242, the suspension strut 210 is assembled by closing the end 228 of the outer tube 212, inserting the inner tube 214 with the compensation valve 224 in position, the piston assembly 216 and piston rod 218, and the rod guide 222. The section 242 is then formed using apparatus 250 as shown in FIGS. 11 and 12.

The apparatus 250 comprises a throughbore 252 which has a longitudinal axis A which aligns with the axis L of the suspension strut 210 during formation of the section 242. Projecting into the throughbore 252 are two pairs of rollers 254, 256. The rollers 254 of the first pair of rollers are positioned substantially diametrically opposed one another relative to the throughbore 252 with aligned longitudinal axes X. The rollers 256 of the second pair of rollers are positioned substantially diametrically opposed one another relative to the throughbore 252 with aligned longitudinal axes Y which are at substantially 90° to the axes X. Both sets of axes X,Y are at substantially 90° to the axis A. As can be seen from FIG. 12, the axes X of the first pair of rollers 254 are offset from the axes Y of the second pair of rollers 256 by an amount H along axis A.

Each roller 254 of the first pair of rollers, which rotates about its axis X, is rotatably mounted on bearings 258 positioned in a bore 260 which opens into the throughbore 252. The bore 260 is defined by a housing 262. The housing 262 is retained in position by way of a stud 264 having a head 266. A helical spring 268 positioned between the head 266 and the housing 262 biases the housing, and hence the roller 254, towards the throughbore 252. With this arrangement, each roller 254 can reciprocate along its axis X relative to the throughbore 252. Each roller 256 of the second pair of rollers, which rotates about its axis Y, is rotatably mounted on bearings 270 positioned in a bore 272 which opens into the throughbore 252. The bore 272 is defined by a housing 274. The housing 274 is fixed in position by way of a stud 276. With this arrangement, the rollers 256 are fixed relative to throughbore 252.

Each roller 254 of the first pair of rollers has a contact surface 278 which is at substantially 45° to the axes X and A. Each roller 256 of the second pair of rollers has a contact surface 280 which is substantially parallel to its axis Y and at substantially 90° to the axis A.

Additional rollers 282 are positioned around, and project into, the throughbore 252. These rollers 282 act on an inserted suspension strut 210 (as explained below) to centralise the suspension strut in the throughbore 252. The position of each roller 282 relative to the throughbore 252 is adjusted and then secured by a threaded stud 284 and nut 286.

Figure 13:
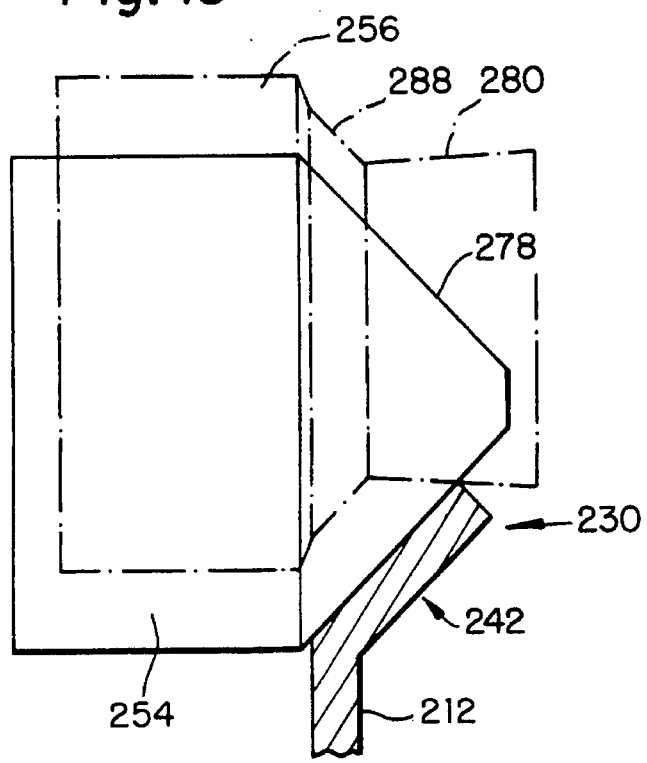
FIGS. 13 and 14 are enlarged side views of the rollers of the apparatus of FIGS. 11 and 12 relative to the tube of the suspension strut during the spin closing operation.
Figure 14:
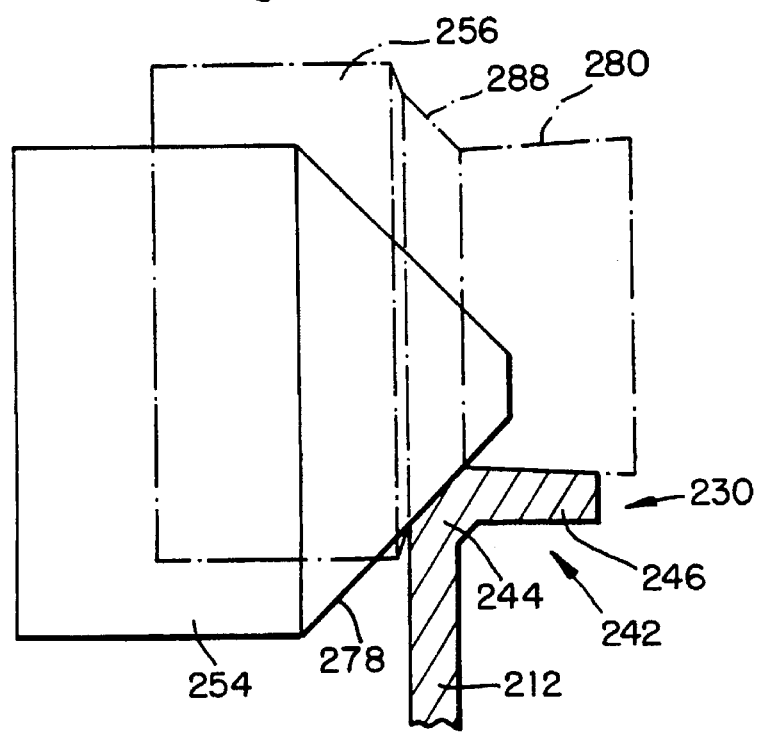

The apparatus 250 is used to spin close the end 230 of the suspension strut 210 as follows. The end 230 of the suspension strut 210, after insertion of the various internal components, is inserted into the throughbore 252 in the direction B relative to the apparatus 250 and spun about its axis L. Any suitable arrangement for spinning the suspension strut 210 which is known to those skilled in the art can be used and will not be described in detail. Initially, the end 230 makes contact with the surfaces 278 of the rollers 254. As the suspension strut 210 continues to move in the direction B, the section 242 of the outer tube 212 is bent over at an angle of approximately 45° by the contact surface 278 as shown in FIG. 13. Further movement of the suspension strut 210 in the direction B brings the free end of the section 242 into contact with the surface 280 of the rollers 256. Still further movement of the suspension strut 210 in the direction B results in the section 242 of the outer tube 212 pushing the rollers 254 back into their bore 260 against the bias of spring 268, and the contact surface 280 on the rollers 256 forming the second portion 246 of the section 242 as shown in FIG. 14. The suspension strut 210 is then removed from the throughbore 252 in the opposite direction to B.

In practice, the contact surface 280 on the rollers 256 is at an angle slightly greater than 90° to allow for the resilience of the second portion 246 of the section 242, which will tend to spring back outwards slightly after spin closing. The contact surface 280 preferably has an extension 288 at the opposite end to its free end which is at an angle of approximately 45° to the axis A which contacts, and retains the integrity of, the first portion 244 of the section 242.

The strength of the spring 268 is predetermined to prevent the rollers 254 retracting too early. The dimension H is predetermined to provide the required dimensions for the first and second portions 244, 246 of the section 242.

Although the above embodiment discloses angles of 45° and 90° for the contact surfaces 278, 280 respectively, it will be appreciated that other angles could be used dependent on the required arrangement of the suspension strut. The only requirement is that the angle of the contact surface on rollers 254 must be smaller than the angle of the contact surface on rollers 256 relative to the axis A.

What is claimed is:

1. A hydraulic damper for a motor vehicle comprising a longitudinally extending tube and a separately formed steering knuckle secured to the tube, wherein the tube is formed from extruded aluminum or aluminum alloy, and the steering knuckle is formed from aluminum or aluminum alloy wherein the mounting means comprises a tubular portion which overlies and is secured to a portion of the extruded tube wherein the tubular portion is secured to the extruded tube through at least a first groove formed in the tubular portion of the mounting means and at least a second groove formed in the portion of the extruded tube that the tubular portion overlies wherein said at least a first groove registers with said at least a second groove, wherein;

the tubular portion of the mounting means includes a hole cut through the tubular portion and opening into said at least a first groove to allow adhesive under pressure to be injected into said hole such that the adhesive substantially fills both said at least a first groove and said at least a second groove to secure the tube to the tubular portion of the mounting means.

2. A hydraulic damper for a vehicle comprising:

a longitudinally extending tube formed from extruded aluminum or aluminum alloy having a longitudinally extending rib with a tapered end, an end cap formed from the tube closing a first end of the tube and having an outer surface with at least one circumferentially extending groove formed in the outer surface between the tapered end and the end cap; and a steering knuckle having a tubular portion with an end of the tubular portion being formed with a tapered surface, the tubular portion having an inner surface with at least one longitudinally extending groove formed in the inner surface with a hole formed in the tubular portion and registering with the longitudinally extending groove;

wherein the steering knuckle is positioned with the tubular portion on the tube so that the tapered surface and tapered end engage each other providing a stop for locating the steering knuckle on the tube with the steering knuckle being secured on the tube by injecting adhesive under pressure into the hole in the tubular portion such that the adhesive flows into and fills the longitudinally extending groove and the circumferentially extending groove.

* * * * *